(12) United States Patent
Zeller et al.

(10) Patent No.: US 7,736,683 B2
(45) Date of Patent: Jun. 15, 2010

(54) METHOD TO INCREASE THE FOAMING CAPACITY OF SPRAY-DRIED POWDERS

(75) Inventors: Bary Lyn Zeller, Glenview, IL (US); Paul Bastiaan Van Seeventer, Meppel (NL); Albert Thijs Poortinga, Deventer (NL)

(73) Assignee: Kraft Food Global Brands LLC, Northfield, IL (US)

( * ) Notice: Subject to any disclaimer, the term of this patent is extended or adjusted under 35 U.S.C. 154(b) by 1113 days.

(21) Appl. No.: 10/919,474

(22) Filed: Aug. 17, 2004

(65) Prior Publication Data

US 2006/0040023 A1 Feb. 23, 2006

(51) Int. Cl.
A23L 2/40 (2006.01)

(52) U.S. Cl. .................. 426/561; 426/564; 426/443

(58) Field of Classification Search .................. 426/561, 426/564, 569, 590, 443
See application file for complete search history.

(56) References Cited

U.S. PATENT DOCUMENTS

| | | | |
|---|---|---|---|
| 3,749,378 A | 7/1973 | Rhodes | |
| 4,263,328 A | 4/1981 | Parada et al. | |
| 4,438,147 A | 3/1984 | Hedrick, Jr. | |
| 4,746,527 A | 5/1988 | Kuypers | |
| 4,748,040 A | 5/1988 | Kuypers | |
| 4,826,699 A | 5/1989 | Soe | |
| 4,891,235 A | 1/1990 | Mizuguchi et al. | |
| 4,965,085 A | 10/1990 | Heyland et al. | |
| 5,350,591 A | 9/1994 | Canton | |
| 5,370,888 A | 12/1994 | Hachiya et al. | |
| 5,399,368 A | 3/1995 | Garwood et al. | |
| 5,433,962 A | 7/1995 | Stipp | |
| 5,624,700 A | 4/1997 | Ogden | |
| 5,721,003 A | 4/1998 | Zeller | |
| 5,750,178 A | 5/1998 | Cheng et al. | |
| 5,780,092 A | 7/1998 | Agbo et al. | |
| 5,882,716 A | 3/1999 | Munz-Schaerer et al. | |
| 5,882,717 A | 3/1999 | Panesar et al. | |
| 6,048,567 A | 4/2000 | Villagran et al. | |
| 6,090,424 A | 7/2000 | Mickowski et al. | |
| 6,129,943 A | 10/2000 | Zeller et al. | |
| 6,168,819 B1 | 1/2001 | Zeller et al. | |
| 6,174,577 B1 | 1/2001 | Vitorino | |
| 6,296,468 B1 | 10/2001 | Deutsch et al. | |
| 6,413,573 B1 | 7/2002 | Reichart et al. | |
| 6,589,328 B1 | 7/2003 | Nussinovitch | |
| 6,669,976 B2 | 12/2003 | Fritz | |
| 6,713,113 B2 | 3/2004 | Bisperink et al. | |
| 2001/0026828 A1 | 10/2001 | Dupart et al. | |
| 2002/0081738 A1 | 6/2002 | Simonsen et al. | |
| 2002/0192329 A1 | 12/2002 | Corriveau et al. | |
| 2003/0026836 A1 | 2/2003 | Darbyshire et al. | |
| 2004/0096562 A1 | 5/2004 | Bisperink et al. | |

FOREIGN PATENT DOCUMENTS

| | | |
|---|---|---|
| EP | 0 458 310 | 11/1991 |
| EP | 0 813 815 | 12/1997 |
| EP | 1 138 210 | 10/2001 |
| EP | 1 228 694 | 8/2002 |
| JP | 62-40255 | 2/1987 |
| JP | 1-235547 | 9/1989 |
| JP | 9-313123 | 12/1997 |
| WO | WO 94/10852 | 5/1994 |
| WO | WO 98/34495 | 8/1998 |
| WO | WO 02/00039 | 1/2002 |
| WO | WO 2004/019699 | 3/2004 |

*Primary Examiner*—Keith D. Hendricks
*Assistant Examiner*—Kelly Bekker
(74) *Attorney, Agent, or Firm*—Stites & Harbison PLLC; Marvin Petry; Stephen J. Weyer

(57) ABSTRACT

A method is provided for producing a powdered soluble foaming composition comprising amorphous particles having internal voids filled with atmospheric pressure gas. The method includes subjecting a spray-dried composition to an external pressure and heating the composition at a temperature below the glass transition temperature. The composition is depressurized to result in at least a portion of vacuous internal voids of the composition to be filled with atmospheric pressure gas.

43 Claims, No Drawings

METHOD TO INCREASE THE FOAMING CAPACITY OF SPRAY-DRIED POWDERS

FIELD OF THE INVENTION

The present invention relates to a method to increase the foaming capacity of powder compositions, and, in particular, a method to increase the foaming capacity of a spray-dried powder by processing the powder at a temperature below the glass transition temperature of the powder.

BACKGROUND OF THE INVENTION

Some conventionally prepared food items include froth or foam. For example, cappuccino, milk shakes, and some soups may have froth or foam. While conventionally prepared food items may be considered preferable by some consumers, other consumers are increasingly demanding the convenience of consumer prepared instant food alternatives. In order to accommodate consumer preferences, manufactures have developed instant food products which give consumers the food products they demand from a convenient instant food product by developing instant food items which have the same or similar characteristics as conventionally prepared food items. One challenge for manufacturers is how to produce a food product having froth or foam from an instant food item.

One prior solution used to manufacture an instant food product which has froth or foam is through the use of powdered foaming compositions which produce foam upon reconstitution in a liquid. Foaming powder compositions have been used to impart froth or foamed texture to a wide variety of foods and beverages. For example, foaming compositions have been used to impart froth or foamed texture to instant cappuccino and other coffee mixes, instant refreshing beverage mixes, instant soup mixes, instant milkshake mixes, instant dessert toppings, instant sauces, hot or cold cereals, and the like, when combined with water, milk, or other suitable liquid.

One prior method for manufacturing a foaming composition is provided by U.S. Pat. No. 6,713,113 which discloses a method for manufacturing a powdered soluble foaming ingredient comprised of a matrix containing carbohydrate, protein, and entrapped pressurized gas produced by heating the composition above the glass transition temperature. Heating these components above the glass transition temperature potentially leads to nonoxidative browning (Maillard) reactions that can adversely affect the appearance, flavor and shelf-life of packaged food products.

WO 2004/019699 discloses another process for forming a foaming composition where a protein composition is subjected to gasification at a temperature above the glass transition temperature of the composition. The foaming composition preferably contains a plasticizer such as a carbohydrate polyol or sugar alcohol and the foaming composition that forms the basis of all working examples disclosed therein contains carbohydrate glycerol at a level of 5% by weight.

U.S. Patent Publication No. 2003/0026836 discloses a method for forming tablets or powders of carbohydrate-based pharmaceuticals or foods which includes subjecting tablets or powders which comprise a beverage base such as soluble coffee, foamed powder, sugar and creamer to pressure and temperature above the glass transition temperature to produce a tablet or powder with increased solubility or dispersability on contact with water. In addition, a method is disclosed which promotes the dissolution or dispersion of a tablet or non-foaming powder by subjecting the tablet or powder to pressurized gas so that gas is entrapped therein to promote dissolution or dispersion of the tablet or powder on contact with water. It is notable that all examples provided therein of chemically compounded soluble compositions are carbohydrate-based powder or tablet compositions containing protein. Improved dissolution of tablets containing entrapped gas is demonstrated in working examples therein. However, improved dissolution or dispersability of powders, foaming or non-foaming, containing entrapped gas is not demonstrated in any working example therein.

Although prior methods exist for producing foaming food and beverage additives, there is still a need for a method for producing foaming compositions without the drawbacks of current methods. For example, prior methods subject the target compositions to high temperatures above the glass transition temperature which may result in browning of the composition, and off-flavors being produced.

SUMMARY OF THE INVENTION

The present invention relates to a method to modify the structure and thereby improve the foaming capacity of spray-dried powders which, prior to application of the method of this invention, contain a large number of sealed internal voids which are closed to the atmosphere. These voids are capable of holding large volumes of gas. However, it is common for spray-dried powders comprising amorphous particles having sealed internal voids that contain entrapped atmospheric pressure gas to also have sealed internal voids that are essentially devoid of gas. Sealed internal voids that are essentially devoid of gas, also referred to herein as vacuous voids, are thought to be formed by evaporation of water from the particles during spray drying. Unfortunately, the presence of vacuous voids reduces the foaming capacity of spray-dried powders upon reconstitution in water or other liquid. Application of the method of this invention opens and fills at least of portion of these vacuous voids with atmospheric pressure gas to beneficially increase the volume of gas held in the powder that is available for providing foam upon reconstitution. In one form, a spray-dried powder comprising amorphous particles having sealed internal voids is subjected to pressurized gas at a temperature below the glass transition temperature and then depressurized to cause at least a portion of any vacuous voids present in the spray-dried powder to be opened and filled with atmospheric pressure gas. Although pressurized gas is not retained in the internal voids for a long time after depressurization, infiltrated atmospheric gas increases the foaming capacity of the powder as a result of the present method.

The present invention in one form thereof relates to a method for manufacturing a powdered soluble foaming composition comprising amorphous particles having internal voids filled with atmospheric pressure gas. The method includes subjecting a powdered soluble spray-dried composition comprising amorphous particles having vacuous internal voids to an external gas pressure and heating the soluble spray-dried composition at a temperature below the glass transition temperature. The composition is depressurized to thereby result in at least a portion of the vacuous internal voids of the composition to be filled with atmospheric pressure gas.

In various further forms, the spray-dried composition is a protein-free composition, a carbohydrate-free composition, a protein composition, or a carbohydrate composition. The spray-dried composition may optionally include a dispersed fat, a surfactant, e.g. an emulsifier, or a buffering agent, e.g. a salt. In further alternate forms, the composition contains atmospheric pressure gas in an amount sufficient to release at least about 2 cc gas per gram of the foaming composition, and preferably at least about 5 cc gas per gram, when dissolved in a liquid at ambient conditions. The spray-dried composition may be produced by any spray drying method known in the art which includes, but is not limited to, gas-injected and non-gas-injected spray drying techniques.

DETAILED DESCRIPTION OF THE PREFERRED EMBODIMENTS

The present invention is directed to powdered foaming compositions having internal voids filled with atmospheric pressure gas using a method in which a spray-dried composition comprising amorphous particles having sealed internal vacuous voids is subjected to external gas pressure and heat at a temperature below the glass transition temperature. The present method results in atmospheric gas being infiltrated and filling the voids of the powder.

Ingredients that can be used to formulate protein-free powders include carbohydrates, lipids, and other protein-free substances. Carbohydrates are preferred and include, but are not limited to, sugars, polyhydric alcohols, sugar alcohols, oligosaccharides, polysaccharides, starch hydrolysis products, gums, soluble fibers, modified starches, and modified celluloses. Suitable sugars include glucose, fructose, sucrose, lactose, mannose, and maltose. Suitable polyhydric alcohols include glycerol, propylene glycol, polyglycerols, and polyethylene glycols. Suitable sugar alcohols include sorbitol, mannitol, maltitol, lactitol, erythritol, and xylitol. Suitable starch hydrolysis products include maltodextrins, glucose syrups, corn syrups, high-maltose syrups, and high-fructose syrups. Suitable gums include xanthan, alginates, carrageenans, guar, gellan, locust bean, and hydrolyzed gums. Suitable soluble fibers include inulin, hydrolyzed guar gum, and polydextrose. Suitable modified starches include physically or chemically modified starches that are soluble or dispersible in water. Suitable modified celluloses include methylcellulose, carboxymethyl cellulose, and hydroxypropylmethyl cellulose.

Ingredients that can be used to formulate carbohydrate-free powders include proteins, lipids, and other carbohydrate-free substances. Proteins are preferred and include, but are not limited to, milk proteins, soy proteins, egg proteins, gelatin, collagen, wheat proteins, and hydrolyzed proteins. Suitable hydrolyzed proteins include hydrolyzed gelatin, hydrolyzed collagen, hydrolyzed casein, hydrolyzed whey protein, hydrolyzed milk protein, hydrolyzed soy protein, hydrolyzed egg protein, hydrolyzed wheat protein, and amino acids. Food ingredients that are both protein-free and carbohydrate free can be used to formulate either type of novel powder and may include, but are not limited to, organic and inorganic salts, surfactants, emulsifiers, phytochemicals, nutritional additives, flow agents, artificial sweeteners, preservatives, colorants, and some flavors. Lipids include, but are not limited to, fats, oils, hydrogenated oils, interesterified oils, phospholipids, waxes, sterols, stanols, terpenes, and fatty acids derived from vegetable, dairy, or animal sources.

Alternatively, the present method can be used on powders which include both carbohydrate and protein using the carbohydrate and proteins listed above. In addition, the powder may be a dried soluble coffee extract. The powdered soluble foaming compositions of this invention can be produced by any method effective to provide a particulate structure having a plurality of internal voids capable of holding gas. Conventional gas-injected spray drying of aqueous solutions is the preferred method to manufacture these powdered soluble foaming compositions, but spray drying of aqueous solutions without gas injection is also a suitable method. Spray drying without gas injection typically produces particles having relatively small internal void volumes, but this less preferred method can also be used to manufacture protein-free, carbohydrate-free, and other powders having suitable internal void volumes. Nitrogen gas is preferred, but any other food-grade gas can be used for gas injection, including air, carbon dioxide, nitrous oxide, or mixture thereof.

It is optional to formulate the foaming compositions of this invention using one or more surfactants to improve bubble formation and creation of internal voids during spray drying. Use of suitable surfactants at appropriate levels can be used to influence the relative size, number, and volume of internal voids. Because most food proteins are naturally surface-active, many suitable carbohydrate-free compositions containing protein can be manufactured with adequate internal void volumes without the need for surfactants. However, it has been discovered that the manufacture of protein-free compositions can be greatly improved by use of surfactants. Surfactants include food-approved emulsifying agents such as polysorbates, sucrose esters, stearoyl lactylates, mono/diglycerides, diacetyl tartaric esters of mono/di-glycerides, and phospholipids. Some carbohydrates are surface-active and can be used in combination with other carbohydrates to formulate protein-free compositions. Suitable surface-active carbohydrates include gum arabic, propylene glycol alginates, and lipophilic modified food starches such as octenylsuccinate substituted starches.

Formulation of protein-based foaming compositions of this invention using one or more buffering agents can be used to facilitate spray drying and reconstitution in liquid. Use of suitable buffering agents at appropriate levels can be used to provide adequate particle internal void volumes while improving powder dissolution and product froth attributes. Preferred buffering agents used in this invention are salts of organic or inorganic acids. In addition to providing the benefits already mentioned, these buffering agents also improve resistance to protein aggregation or denaturation in certain product applications such as acidic beverages. The most preferred buffering agents are sodium and potassium salts of organic acids. Suitable buffering agents include, but are not limited to, sodium, potassium, calcium, and magnesium salts of citric, malic, fumaric, and phosphoric acid.

Powders which are used to manufacture the foaming compositions in this invention have a bulk density and a tap density in the range of 0.1-0.7 g/cc, typically 0.2-0.6 g/cc, a skeletal density in the range of 0.3-1.6 g/cc, typically 0.4-1.5 g/cc, a true density of 1.2-1.6 g/cc, and an internal void volume in the range of 5-80%, typically 10-75%, before subjecting to external gas pressure. Powders with relatively large internal void volumes are generally preferred because of their greater capacity to hold gas. Internal void volume is suitably at least about 10%, preferably at least about 30%, and more preferably at least about 50%. The powders have a glass transition temperature between 30-150° C., typically 40-125° C., and more typically 50-100° C. The powders have a moisture content between 0-15%, typically 1-10%, more typically 2-5% and water activity between 0-0.5, typically 0.05-0.4, and more typically 0.1-0.3.

The term "entrapped gas" means that gas is present in the internal voids of a powder structure and is not able to leave this structure, without opening the powder structure. The term "held gas" means that gas is present in the internal voids of a powder structure and is able to enter and leave the structure, as through a crack or other opening, in response to changes in external ambient gas pressure or gas composition. Preferably, the majority of the gas present in the powder, after applying and releasing an external gas pressure according to embodiments of this invention, is held physically in internal voids of the powder that are connected to the atmosphere. Gases that can suitably be used according to the present invention can be selected from nitrogen, carbon dioxide, nitrous oxide, air, or mixture thereof. Nitrogen is preferred, but any other food-grade gas can be used to apply external gas pressure to the powder The term "structure", "particulate structure", "particle structure", or "powder structure" means a structure which contains a large number of sealed internal voids which are closed to the atmosphere, a large number of internal voids which are open to the atmosphere, or combination thereof. These voids are capable of holding a large volume of gas that is released as bubbles upon dissolution of the structure in a liquid to produce foam. The term "amorphous" means a glassy structure which is predominantly non-crystalline.

The term "powdered soluble foaming composition", "powdered foaming composition", or "foaming composition" means any powder that is soluble in, or disintegrates in a liquid, and especially in an aqueous liquid, and that upon contact with such liquid forms a foam or froth.

Percentages are based on the weight of the foaming composition, unless otherwise indicated.

The terms "carbohydrate" and "protein" mean any carbohydrate or protein, respectively, that is compatible with the end use of the powder of the invention. This will in practice mean that it must be acceptable for consumption.

The term "emulsifier" means any surface-active compound that has oil or gas emulsifying properties which is compatible with the end use of the powder of the invention and which is not a protein.

Bulk density (g/cc) is determined by measuring the volume (cc) that a given weight (g) of powder occupies when poured through a funnel into a graduated cylinder. Tap density (g/cc) is determined by pouring the powder into a graduated cylinder, vibrating the cylinder until the powder settles to its lowest volume, recording the volume, weighing the powder, and dividing weight by volume. Skeletal density (g/cc) is determined by measuring the volume of a weighed amount of powder using a helium pycnometer (Micromeritics AccuPyc 1330) and dividing weight by volume. Skeletal density is a measure of density that includes the volume of any voids present in the particles that are sealed to the atmosphere and excludes the interstitial volume between particles and the volume of any voids present in the particles that are open to the atmosphere. The volume of sealed voids, referred to herein as internal voids, is derived from also measuring the skeletal density of the powder after grinding with mortar and pestle to remove or open all internal voids to the atmosphere. This type of skeletal density, referred to herein as true density (g/cc), is the actual density of only the solid matter comprising the powder. Internal void volume (%), the volume percent of sealed internal voids contained in the particles comprising the powder, is determined by subtracting the reciprocal true density (cc/g) from the reciprocal skeletal density (cc/g) and then multiplying the difference by skeletal density (g/cc) and 100%.

The glass transition temperature marks a secondary phase change characterized by transformation of the powder composition from a rigid glassy state to a softened rubbery state. In general, gas solubilities and diffusion rates are higher in materials at or above the glass transition temperature. The glass transition temperature is dependent on chemical composition and moisture level and, in general, lower average molecular weight and/or higher moisture will lower glass transition temperature. The glass transition temperature can intentionally be raised or lowered by simply decreasing or increasing, respectively, the moisture content of the powder using any suitable method known to one skilled in the art. Glass transition temperature can be measured using established Differential Scanning Calorimetry or Thermal Mechanical Analysis techniques.

Novel foaming compositions of this invention that contain held atmospheric pressure gas can be manufactured by heating any spray-dried powder, including but not limited to a protein-based powder, a carbohydrate-based powder, a soluble coffee-based powder or a combination thereof, having appropriate particle structure containing sealed internal vacuous voids, to a temperature below the glass transition temperature under pressure in any suitable pressure vessel and cooling the powder either by rapid release of pressure or by cooling the vessel prior to depressurization. One method is to seal the powder in the pressure vessel and pressurize with compressed gas, then heat the pressure vessel either by placing in a preheated oven or bath or by circulation of electric current or hot fluid through an internal coil or external jacket to increase the temperature of the powder, but not to or above the glass transition temperature, for a period of time effective to fill internal voids in the particles with pressurized gas, then cool the still pressurized vessel containing the powder to about room temperature either by placing in a bath or by circulation of cold fluid, then release the pressure and open the vessel to recover the foaming composition. The preferred method is to conduct gas pressurization and depressurization of the powder in the pressure vessel at ambient temperature without external heating or cooling. The foaming composition can be produced in batches or continuously using any suitable means.

In general, powders are heated at a temperature in the range of 5-70° C., preferably 20-60° C., and more preferably 25-40° C. for 1-1000 seconds, preferably 5-600 seconds, and more preferably 60-300 seconds. The pressure inside the pressure vessel is in the range of 100-3000 psi, preferably 200-2000 psi, and more preferably 500-1500 psi. Use of nitrogen gas is preferred, but any other food-grade gas can be used to pressurize the vessel, including air, carbon dioxide, nitrous oxide, or mixture thereof. Powder gas content and foaming capacity generally increase with processing pressure. Heating can cause the initial pressure delivered to the pressure vessel to increase considerably. The maximum pressure reached inside the pressure vessel during heating can be approximated by multiplying the initial pressure by the ratio of heating temperature to initial temperature using Kelvin units of temperature. For example, pressurizing the vessel to 1000 psi at 25° C. (298 K) and then heating to 70° C. (343 K) should increase the pressure in the pressure vessel to approximately 1150 psi. The resulting powdered foaming compositions containing entrapped atmospheric gas generally have particle size between about 1 to 5000 microns, typically between about 5 to 2000 microns, and more typically between about 10 to 1000 microns.

The extent to which sealed internal voids in the powder are opened generally increases with applied external gas pressure and time and relatively high pressures can be used to increase effectiveness and shorten processing time. Particle size distribution of the powders is typically not meaningfully altered when gasification is conducted under preferred conditions. It is believed that the applied external gas pressure forms stress cracks in the glassy amorphous particles comprising the powder which open at least a portion of the sealed internal voids to allow at least a portion of the vacuous voids to be filled with atmospheric pressure gas upon release of the external gas pressure.

When powders are pressurized below the glass transition temperature and depressurized, it is common for these particles to produce a faint popping sound during a brief time after depressurization. Powder appearance and bulk density are typically not significantly altered by pressurizing below the glass transition temperature, but skeletal density, internal void volume, and held gas content are typically significantly altered.

Powders retain their modified structure, internal void volume, and held gas content with good stability when stored below the glass transition temperature with adequate protection against moisture intrusion. Powders stored in a closed container at room temperature generally perform well many months later. Powders pressurized below the glass transition temperature do not retain pressurized gas for a long period of time. However, it was surprisingly discovered that spray-dried powders that are pressurized below the glass transition temperature typically produce significantly more froth than the unpressurized powders even after the pressurized gas is lost. It is believed that this beneficial increase in foaming capacity is caused by infiltration of atmospheric pressure gas into previously vacuous internal voids formed by evaporation of water from the particles during drying. It has been found that this novel method to increase the foaming capacity of spray-dried foaming compositions can be conducted at room temperature with excellent results.

The preferred use for these novel foaming compositions is in soluble beverage mixes, particularly instant coffee and cappuccino mixes. However, they can be used in any instant food product that is rehydrated with liquid. Although these foaming compositions typically dissolve well in cold liquids to produce froth, dissolution and foaming capacity are generally improved by reconstitution in hot liquids. Applications include instant beverages, desserts, cheese powders, cereals, soups, topping powders, and other products.

The following examples are included to provide a further understanding of the present invention but in no way limit the scope of the present invention.

Example 1

A 50% aqueous solution of 33 DE glucose syrup solids (92% dry basis) and octenylsuccinate substituted starch (8% dry basis) was nitrogen injected and spray dried to produce a protein-free powder comprised of amorphous particles having a plurality of internal voids. The essentially 100% carbohydrate powder had white color, a bulk density of 0.25 g/cc, a tap density of 0.31 g/cc, a skeletal density of 0.59 g/cc, an internal void volume of 61%, a true density of 1.51 g/cc, a $T_g$ of 74° C., and moisture content of about 2%. Use of the powder in an instant sweetened coffee mix, using a weight ratio of about three parts powder to one part soluble coffee to two parts sugar, produced an amount of froth that completely covered the surface of the beverage to a height of about 7 mm when about 11 g of the mix was reconstituted in a 250 ml beaker having 65 mm internal diameter using 130 ml of 88° C. water.

6 g of the protein-free powder was pressurized at 25° C. with nitrogen gas at 1000 psi for 5 minutes in a pressure vessel (75 cc capacity stainless steel gas-sampling cylinder; manufactured by Whitey Corporation; used in all examples herein) and then depressurized. Replacing the untreated powder with an equal weight of treated powder in the sweetened coffee mix revealed that treatment increased the foaming capacity of the powder by about 140%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 2 cc gas per gram of powder while the treated powder released about 5 cc gas per gram of powder. The powder produced a faint popping sound for a short time after depressurization, presumably due to bursting of walls surrounding diffusion-restricted open voids that were too weak to contain the pressurized gas. Bulk density of the treated powder was not altered, but skeletal density increased to 0.89 g/cc and internal void volume decreased to 41%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Example 2

A 50% aqueous solution of 33 DE glucose syrup solids (98.5% dry basis), polysorbate 20 (1% dry basis), and propylene glycol alginate (0.5% dry basis) was nitrogen injected and spray dried to produce a protein-free powder comprised of amorphous particles having a plurality of internal voids. The approximately 99% carbohydrate powder had white color, a bulk density of 0.24 g/cc, a tap density of 0.30 g/cc, a skeletal density of 0.64 g/cc, an internal void volume of 56%, a true density of 1.47 g/cc, a $T_g$ of 68° C., and moisture content of about 4%. Use of the powder in the sweetened coffee mix according to the method of Example 1 produced an amount of froth that completely covered the surface of the beverage to a height of about 11 mm when about 11 g of the mix was reconstituted in a 250 ml beaker having 65 mm internal diameter using 130 ml of 88° C. water.

6 g of the protein-free powder was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 65%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 6 cc gas per gram of powder. The powder produced a faint popping sound for a short time after depressurization. Bulk density of the treated powder was not altered, but skeletal density increased to 1.04 g/cc and internal void volume decreased to 29%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Example 3

Table 1 below summarizes the results obtained when additional 6 g samples of the spray-dried protein-free powder of Example 1 were pressurized at 25° C. with nitrogen gas for the times and pressures listed below according to the method of Example 1 when an equal weight of treated powder was substituted for the untreated powder in the sweetened coffee mix according to the method of Example 1. The Untreated Product is the untreated powder of Example 1 and is included in the table for comparison. Products A and B are other samples of the untreated powder that were pressurized at 250 psi for different times; Product C is another sample of the untreated powder that was pressurized at 375 psi; Product D is another sample of the untreated powder that was pressurized at 500 psi; and Product E is another sample of the untreated powder that was pressurized at 750 psi. Product F is the powder of Example 1 that was pressurized at 1000 psi and is included in the table for comparison. Product G is another sample of the untreated powder that was pressurized at 1000 psi for a longer time than Product F. It can be seen that pressurizing at 250 psi for 30 minutes only slightly increased the foaming capacity relative to pressurizing at 250 psi for only 5 minutes. Pressurizing at 375 psi, 500 psi, 750 psi, or 1000 psi for 30 minutes did not further increase the foaming capacity of the corresponding powders that were pressurized for only 5 minutes.

TABLE 1

| Product | Pressure (psi) | Time (Minutes) | % Increase in Coffee Mix Froth Height (in 250 ml Beaker) | Estimated Gas Release from Foaming Composition (cc Gas/g Powder) |
| --- | --- | --- | --- | --- |
| Untreated | — | — | — | 2 |
| A | 250 | 5 | 0 | 2 |
| B | 250 | 30 | 30 | 3 |
| C | 375 | 5 | 30 | 3 |
| D | 500 | 5 | 55 | 4 |
| E | 750 | 5 | 100 | 5 |
| F | 1000 | 5 | 100 | 5 |
| G | 1000 | 30 | 100 | 5 |

Example 4

Table 2 below summarizes the results obtained when additional 6 g samples of the spray-dried protein-free powder of Example 2 were pressurized at 25° C. with nitrogen gas for 5 minutes at the pressures listed below according to the method of Example 1 when an equal weight of treated powder was substituted for the untreated powder in the sweetened coffee mix according to the method of Example 1. The Untreated Product is the untreated powder of Example 2 and is included in the table for comparison. Product A is another sample of the untreated powder that was pressurized at 250 psi; Product B is another sample of the untreated powder that was pressurized at 375 psi; Product C is another sample of the untreated powder that was pressurized at 500 psi; and Product D is another sample of the untreated powder that was pressurized at 750 psi. Product E is the powder of Example 2 that was pressurized at 1000 psi and is included in the table for comparison. Product F is another sample of the untreated powder that was pressurized at 1250 psi for a longer time than Product E. Pressurizing at 250 psi or 1000 psi for 30 minutes did not further increase the foaming capacity of the corresponding powders that were pressurized at 250 psi or 1000 psi for only 5 minutes. Increasing the pressure was found to progressively increase skeletal density by presumably opening a greater portion of previously vacuous internal voids, which decreased the total volume of remaining internal voids while increasing the foaming capacity of the powder. The bulk density of the powder was not affected by the pressure treatments.

TABLE 2

| Product | Pressure (psi) | Internal Void Volume (%) | % Increase in Coffee Mix Froth Height (in 250 ml Beaker) | Estimated Gas Release from Foaming Composition (cc Gas/g Powder) |
| --- | --- | --- | --- | --- |
| Untreated | — | 56 | — | 3.5 |
| A | 250 | 42 | 0 | 3.5 |
| B | 375 | 39 | 15 | 4.5 |
| C | 500 | 37 | 25 | 5 |
| D | 750 | 33 | 55 | 6 |
| E | 1000 | 29 | 55 | 6 |
| F | 1250 | 28 | 55 | 6 |

Example 5

A 50% aqueous solution of lactose and 33 DE glucose syrup solids (52% dry basis), skim milk powder (47% dry basis), and disodium phosphate (1% dry basis) was nitrogen injected and spray dried to produce a powder containing carbohydrate and protein. The white powder had amorphous particle structure, a milky odor, a bulk density of 0.34 g/cc, a tap density of 0.40 g/cc, a skeletal density of 0.71 g/cc, an internal void volume of 52%, a true density of 1.49 g/cc, a $T_g$ of 61° C., and moisture content of about 3%. Use of the powder in the sweetened coffee mix according to the method of Example 1 produced an amount of froth that completely covered the surface of the beverage to a height of about 10 mm when about 11 g of the mix was reconstituted in a 250 ml beaker having 65 mm internal diameter using 130 ml of 88° C. water.

6 g of the powder containing carbohydrate and protein was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 160%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 8.5 cc gas per gram of powder. The powder produced a faint popping sound for a short time after depressurization. Bulk density of the treated powder was not altered, but skeletal density increased to 0.75 g/cc and internal void volume decreased to 50%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Example 6

A commercial carbohydrate-free hydrolyzed gelatin powder, produced by spray drying an aqueous solution without gas injection, was obtained. The 99.2% dry-basis protein powder had amorphous particle structure, light yellow color, a bulk density of 0.45 g/cc, a tap density of 0.54 g/cc, a skeletal density of 1.15 g/cc, an internal void volume of 18%, a true density of 1.41 g/cc, a $T_g$ of 80° C., and moisture content of about 6%. The powder was added to an instant cappuccino mix, using a weight ratio of about one part powder to one part soluble coffee to two parts sugar to three parts foaming creamer. Reconstitution of about 13 g of the cappuccino mix in a 250 ml beaker having 65 mm internal diameter using 130 ml of 88° C. produced an amount of froth that completely covered the surface of the beverage to a height of about 14 mm.

6 g of the carbohydrate-free powder was pressurized at 25° C. with nitrogen gas at 1000 psi for 5 minutes in a pressure vessel and then depressurized. Replacing the untreated powder with an equal weight of treated powder in the cappuccino mix revealed that treatment increased the foaming capacity of the powder by about 150%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 2 cc gas per gram of powder while the treated powder released about 5.5 cc gas per gram of powder. The powder produced a faint popping sound for a short time after depressurization. Bulk density of the treated powder was not altered, but skeletal density increased to 1.24 g/cc and internal void volume decreased to 12%, indicating the force of pressurization and/or depressurization opened a portion of previously vacuous internal voids, formed during particle dehydration, to the atmosphere to increase foaming capacity. This hypothesis is supported by the fact that even after one week, the treated powder retained increased foaming capacity.

Example 7

A 50% aqueous solution of 33 DE glucose syrup solids (82% dry basis) and surface-active sodium octenylsuccinate substituted starch (8% dry basis) containing a dispersed emulsion of partially hydrogenated soybean oil (10% dry basis) was nitrogen injected and spray dried to produce a protein-free powder comprised of amorphous particles having a plurality of internal voids. The approximately 90% carbohydrate powder had white color, a bulk density of 0.21 g/cc, a tap density of 0.26 g/cc, a skeletal density of 0.52 g/cc, an internal void volume of 64%, a true density of 1.44 g/cc, a $T_g$ of 65° C., and moisture content of about 3%. Use of the powder in an instant sweetened coffee mix according to the method of Example 1 produced an amount of froth that completely covered the surface of the beverage to a height of about 10 mm when about 11 g of the mix was reconstituted in a 250 ml beaker having 65 mm internal diameter using 130 ml of 88° C. water.

6 g of the protein-free powder was pressurized at 25° C. with nitrogen gas at 1000 psi for 5 minutes in a pressure vessel and then depressurized. Replacing the untreated powder with an equal weight of treated powder in the sweetened coffee mix revealed that treatment increased the foaming capacity of the powder by about 100%. Knowledge of the reconstituted beverage mix froth density and incremental froth volume contributed by the treated and untreated powders was used to estimate the amount (corrected to room temperature and pressure) of gas released by each powder. It was estimated that the untreated powder released about 3.5 cc gas per gram of powder while the treated powder released about 6.5 cc gas per gram of powder. The powder produced a faint popping sound for a short time after depressurization, presumably due to bursting of walls surrounding diffusion-restricted open voids that were too weak to contain the pressurized gas. Bulk density of the treated powder was not altered, but skeletal density increased to 0.64 g/cc and internal void volume decreased to 56%, indicating the force of pressurization and/or depressurization opened a portion of previously vacuous internal voids, formed during particle dehydration, to the atmosphere to increase foaming capacity.

Example 8

A spray-dried soluble espresso coffee powder was manufactured according to the teachings of U.S. Pat. No. 5,882,717. The powder had amorphous particle structure, a bulk density of 0.19 g/cc, a tap density of 0.22 g/cc, a skeletal density of 0.72 g/cc, an internal void volume of 51%, a true density of 1.47 g/cc, and a $T_g$ of 74° C. Use of the powder in the instant cappuccino mix of Example 7 produced an amount of froth that completely covered the surface of the beverage to a height of about 14 mm when 11 g of the cappuccino mix was reconstituted with 130 ml of 88° C. water in a 250 ml beaker 5 g of the powder was pressurized at 25° C. with nitrogen gas at 1000 psi for 5 minutes in a pressure vessel and then depressurized. Replacing the untreated coffee powder with an equal weight of treated coffee powder in the instant cappuccino mix revealed that treatment increased the foaming capacity of the coffee powder by about 65%. Knowledge of the reconstituted beverage mix froth density and incremental froth volume contributed by the treated and untreated coffee powders was used to estimate the amount (corrected to room temperature and pressure) of gas released by each powder. It was estimated that the untreated coffee powder released about 4 cc gas per gram of coffee while the treated coffee powder released about 6.5 cc gas per gram of coffee. The powder produced a faint popping sound for a short time after depressurization. Bulk density of the treated powder was not altered, but skeletal density increased to 1.35 g/cc and internal void volume decreased to 8%, indicating the force of pressurization and/or depressurization opened a portion of previously vacuous internal voids, formed during particle dehydration, to the atmosphere to increase foaming capacity.

Although the invention has been described in considerable detail with respect to preferred embodiments, it will be apparent that the invention is capable of numerous modifications and variations, apparent to those skilled in the art, without departing from the spirit and scope of the invention.

What is claimed is:

1. A method for manufacturing a powdered soluble foaming composition comprising amorphous particles having atmospheric pressure gas held in internal voids of the composition which are open to the atmosphere, said method comprising:

applying an external gas pressure to a powdered soluble spray-dried composition comprising amorphous particles having sealed vacuous internal voids, while the amorphous particles are in a rigid glassy state at a temperature below the glass transition temperature of the particles, to thereby open at least a portion of the sealed voids to the atmosphere; and depressurizing the composition comprising the rigid glassy state amorphous particles, to thereby result in opened voids which hold external gas while not entrapping the external gas in the composition, wherein the entrapped gas is unable to leave without dissolving the composition in a liquid and the held gas is able to leave without dissolving the composition in a liquid.

2. The method of claim 1, wherein the external gas pressure is at least about 200 psi.

3. The method of claim 1, wherein said external gas pressure is at least about 500 psi.

4. The method of claim 1, wherein said external gas pressure is at least about 1000 psi.

5. The method of claim 1, wherein said external gas pressure is applied for at least about 1 second.

6. The method of claim 1, wherein said external gas pressure is applied for at least about 1 minute.

7. The method of claim 1, wherein gas used to effect said external gas pressure is a gas selected from the group consisting of air, nitrogen, carbon dioxide, nitrous oxide, and mixture thereof.

8. The method of claim 1, wherein said spray-dried composition is protein-free.

9. The method of claim 8, wherein said spray-dried composition comprises a dispersed fat.

10. The method of claim 8, wherein said spray-dried composition comprises a carbohydrate.

11. The method of claim 10, wherein said spray-dried composition further comprises a surfactant.

12. The method of claim 11, wherein said surfactant is an emulsifier.

13. The method of claim 12, wherein said emulsifier is selected from the group consisting of a polysorbate, sucrose ester, stearoyl lactylate, mono/di-glyceride, diacetyl tartaric ester of mono/di-glycerides, phospholipid, propylene glycol alginate, lipophilic modified starch, or mixture thereof.

14. The method of claim 1 wherein said spray-dried composition is carbohydrate-free.

15. The method of claim 14, wherein said spray-dried composition comprises a protein.

16. The method of claim 14, wherein said spray-dried composition comprises a dispersed fat.

17. The method of claim 14, wherein said spray-dried composition further comprises a buffering agent.

18. The method of claim 17, wherein said buffering agent is a salt of an organic or inorganic acid.

19. The method of claim 18, wherein said salt is selected from the group consisting of a sodium salt, potassium salt, magnesium salt, or calcium salt, of citric acid, fumaric acid, malic acid, phosphoric acid, or mixture thereof.

20. The method of claim 1, wherein said spray-dried composition comprises a dispersed fat.

21. The method of claim 1, wherein said composition has an internal void volume of at least about 10% before subjecting to the external gas pressure.

22. The method of claim 1, wherein said particles have an internal void volume of at least about 30% before subjecting to said external gas pressure.

23. The method of claim 1, wherein said particles have an internal void volume of at least about 50% before subjecting to said external gas pressure.

24. The method of claim 1, wherein said composition contains atmospheric pressure gas in an amount sufficient to release at least about 2 cc gas per gram of said foaming composition when dissolved in liquid at ambient conditions.

25. The method of claim 1, wherein said composition contains atmospheric pressure gas in an amount sufficient to release at least about 5 cc gas per gram of said foaming composition when dissolved in liquid at ambient conditions.

26. The method of claim 1, further comprising cooling the soluble spray-dried composition from a heated temperature below the glass transition temperature.

27. The method of claim 26, wherein said cooling is conducted prior to depressurizing the composition.

28. The method of claim 26, wherein said cooling is conducted while depressurizing the composition.

29. The method of claim 26, wherein said cooling comprises cooling the composition from heated to below the glass transition temperature to about room temperature.

30. The method of claim 1, wherein said applying external pressure is conducted while applying heat to the composition.

31. The method of claim 1, wherein said applying heat is conducted prior to applying external pressure to the composition.

32. The method of claim 1, wherein said spray-dried composition is formed via gas-injected spray drying of an aqueous solution.

33. The method of claim 1, further comprising gas-injected spray-drying of an aqueous solution to form the composition with particles having internal voids.

34. The method of claim 33, wherein gas used in said gas-injected spray-drying is selected from the group consisting of air, nitrogen, carbon dioxide, nitrous oxide, and mixture thereof.

35. The method of claim 1, further comprising non-gas-injected spray-drying of an aqueous solution to form the composition with particles having internal voids.

36. The method of claim 1, wherein the applied external gas pressure is sufficient to form stress cracks in the soluble spray-dried composition which is in the form of glassy amorphous particles.

37. A method for manufacturing a powdered soluble foaming composition comprising amorphous particles having internal voids filled with atmospheric pressure, said method comprising:

applying an external gas pressure to a powdered soluble spray-dried composition comprising amorphous particles having vacuous internal voids, at a temperature below the glass transition temperature of the particles and which is between 20° C. and 60° C., wherein the external gas pressure is sufficient to form stress cracks in the soluble spray-dried composition which is in the form of glassy amorphous particles; and depressurizing the composition to thereby result in at least a portion of vacuous internal voids of the composition being open to the environment, wherein the internal voids hold external gas while not entrapping the external gas, wherein the entrapped gas is unable to leave without dissolving the composition in a liquid and the held gas is able to leave without dissolving the composition in a liquid.

38. A method for manufacturing a powdered soluble foaming composition comprising amorphous particles having atmospheric pressure gas held in internal voids of the composition which are open to the atmosphere, said method consisting of:

applying an external gas pressure to a powdered soluble spray-dried composition comprising amorphous particles having sealed vacuous internal voids, while the amorphous particles are in a rigid glassy state at a temperature below the glass transition temperature of the particles, to thereby open at least a portion of the sealed voids to the atmosphere; and depressurizing the composition comprising the rigid glassy state amorphous particles, to thereby result in the opened voids being filled with held atmospheric pressure gas, wherein the held gas is able to leave without dissolving the composition in a liquid.

39. The method of claim 38, wherein the applied external gas pressure opens at least a portion of the sealed voids to the atmosphere without entrapping the external gas.

40. The method of claim 38, wherein, upon depressurization, the external gas is not entrapped in the composition.

41. The method of claim 38, wherein the applied external gas pressure forms stress cracks in the rigid glassy state amorphous particles.

42. The method of claim 38, wherein the held atmospheric gas is held in equilibrium with the atmosphere.

43. The method of claim 1, wherein said depressurizing the composition does not include rapidly quenching the composition.

* * * * *